United States Patent
Novak et al.

(10) Patent No.: US 8,582,119 B2
(45) Date of Patent: Nov. 12, 2013

(54) LARGE SCALE METROLOGY APPARATUS AND METHOD

(75) Inventors: W. Thomas Novak, Hillsborough, CA (US); Daniel G. Smith, Tucson, AZ (US); Lloyd Holland, Kitchener (CA)

(73) Assignee: Nikon Corporation, Tokyo (JP)

( * ) Notice: Subject to any disclaimer, the term of this patent is extended or adjusted under 35 U.S.C. 154(b) by 134 days.

(21) Appl. No.: 13/214,717

(22) Filed: Aug. 22, 2011

(65) Prior Publication Data

US 2012/0050726 A1    Mar. 1, 2012

Related U.S. Application Data

(60) Provisional application No. 61/376,477, filed on Aug. 24, 2010.

(51) Int. Cl.
*G01B 11/14*    (2006.01)

(52) U.S. Cl.
CPC ...................................... *G01B 11/14* (2013.01)
USPC .......................................... 356/614; 356/620

(58) Field of Classification Search
CPC ....................................................... G01B 11/14
USPC ................................................ 356/601–625
See application file for complete search history.

(56) References Cited

U.S. PATENT DOCUMENTS

| | | | |
|---|---|---|---|
| 6,662,103 B1 | 12/2003 | Skolnick et al. | |
| 8,380,350 B2 * | 2/2013 | Ozick et al. | 700/253 |
| 2012/0050752 A1 * | 3/2012 | Novak et al. | 356/623 |

OTHER PUBLICATIONS

"iSpace, Large volume metrology, tracking and positioning", Nikon Metrology NV, Jul. 2010, 6 pages.

* cited by examiner

*Primary Examiner* — Michael P Stafira
(74) *Attorney, Agent, or Firm* — The Law Office of James W. Rose PC (57) ABSTRACT

A metrology system that uses a plurality of photo-detecting targets positioned on the objects to be assembled, a plurality of rotating photo-emitting heads, a master signal generator that generates a reference RF signal, and a signal processor that determines the position of each of the targets from signals generated by each target in response to the photo-emitting heads. During operation, the reference RF signal is broadcast to the rotating photo-emitting heads and the photo-detecting targets. The RF signal is used to determine the azimuth of the heads relative to a zero reference position to a high degree of accuracy.

31 Claims, 8 Drawing Sheets

LARGE SCALE METROLOGY APPARATUS AND METHOD

RELATED APPLICATIONS

This application claims the benefit of U.S. Provisional Application 61/376,477 entitled "Large Scale Metrology System Using Passive targets" filed Aug. 24, 2010, incorporated herein for all purposes.

BACKGROUND

1. Field of the Invention

This invention relates to the robotic control of position tracking, alignment, and assembly of large-scale industrial equipment, and more particularly, to a large scale metrology system.

2. Description of Related Art

Large-scale metrology systems used for the factory assembly of industrial equipment are known. These metrology systems typically include both target-sensors and laser-transmitters. During operation in an aircraft assembly facility for example, a number of the target-sensors are placed on the major components of an airplane to be assembled, such as the fuselage, wings, tail, etc. The laser-transmitters are positioned at various locations across the assembly floor. The laser-transmitters, which each rotate at a different rate, each generate a fan-beam pair. In addition, each of the laser-transmitters also generates an optical "flash" beam every two rotations. The flash beam is generated when the laser-transmitter is at a "zero" degree reference position.

As each of the laser-transmitting heads rotate, the corresponding fan-beam pairs sweep across the target-sensors. In response to each fan-beam pair, each target-sensor generates a pulsed pair of signals, which are provided to a central computer. For each of the pulsed pair of signals, the central computer determines:

(i) the corresponding laser-transmitting head, among the plurality of heads, resulting in the pulsed pair of signals. Since each head rotates at a different rate, the time for each fan-beam pair to make a full rotation is different. Based on this timing information, the corresponding laser-transmitting head that resulted in the generation of the pulsed pair of signals can be determined;

(ii) the azimuth of the target relative to the zero reference position of the corresponding head. The azimuth is determined by the rotational angle of the fan-beams when detected by the target relative to the zero degree reference position, as defined by the flash beam; and (iii) the elevation of the target-sensor relative to the corresponding head based on the timing between the first pulse and the second pulse of the pulsed pair of signals.

The central computer then generates a vector for each pulsed pair of signals. Each vector originates at the identified corresponding head and is defined by the determined azimuth and elevation. The central computer then determines the location of the targets where two or more of the vectors intersect.

The above-described process is continuously performed during the assembly operation. As the components to be assembled are moved, the location of the targets is tracked in real-time. The robot system in response makes adjustments on the fly, resulting in more accuracy and precision during assembly.

Although advantageous, the above-described metrology system has a number of issues that are less than ideal. With the optical flash beam, it is difficult to generate a well-defined signal on the order of nanoseconds. As a result, the timing of the signals received from the laser-transmitting heads with respect to the zero reference position of a head may be inaccurate. In addition, the flash beams will often reflect off of non-target surfaces, such as windows in the assembly area or even the objects to be assembled, particularly if they are made of highly reflective surfaces, such as metal. As a result, stray pulses may be generated, causing false or inaccurate azimuth calculations to be performed. Both of these factors reduced the accuracy of the current metrology systems.

SUMMARY OF THE INVENTION

The above-described problems are solved by a metrology system that uses a plurality of photo-detecting targets positioned on the objects to be assembled, a plurality of photo-emitting heads each generating a pair of rotating fan beams, a master signal generator that generates a reference RF signal, and a signal processor that determines the position of each of the targets from signals generated by each target in response to the rotating fan beam pairs generated by the photo-emitting heads. During operation, the reference RF signal is broadcast to the photo-emitting heads and the photo-detecting targets. The RF signal is used to determine the azimuth of the fan beams generated by each head relative to a zero reference position to a high degree of accuracy. Also, the RF signal is received at each of the targets and is used to synchronize the system master clocks to the internal clocks of the targets. With this arrangement, the timing of the pulsed pair of signals generated by the targets is more accurately determined. As a result, the azimuth and elevation calculations of the targets relative to the heads are more precise. The use of an RF signal, as opposed to a flash beam generated by each rotating photo-emitting head, provides a much more accurate reference signal, resulting in a more accurate determination of the location of the targets. In addition, RF signals are less susceptible to reflection off of non-target surfaces compared to optical flash beams. As a result, the metrology system of the present invention is more precise and accurate.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

The above-listed figures are illustrative and are provided as merely examples of embodiments for implementing the various principles and features of the present invention. It should be understood that the features and principles of the present invention may be implemented in a variety of other embodiments and the specific embodiments as illustrated in the Figures should in no way be construed as limiting the scope of the invention.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

Figure 1:
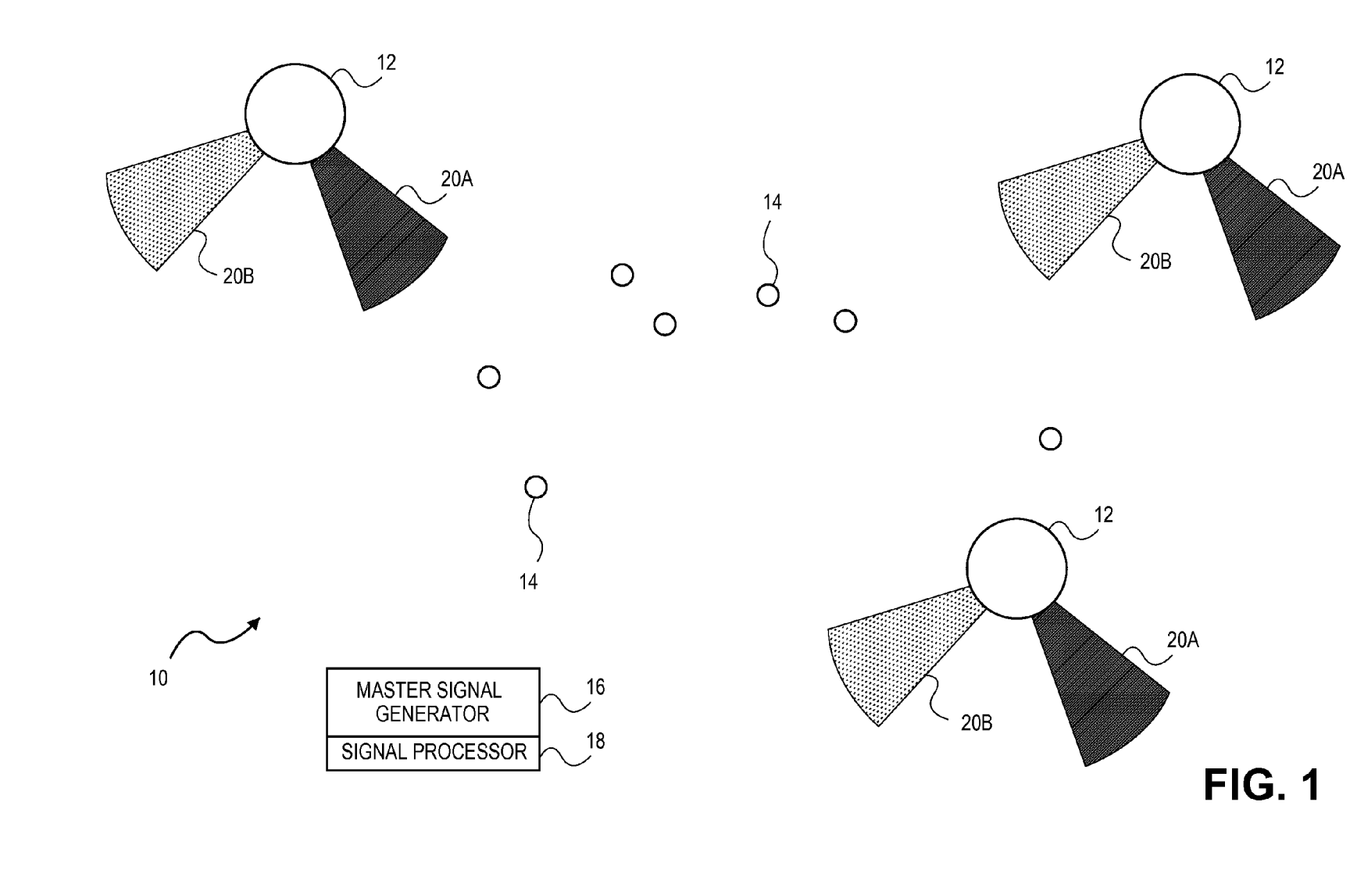
FIG. 1 illustrates a non-exclusive embodiment of a metrology system in accordance with the principles of the present invention.

Referring to FIG. 1, a non-exclusive embodiment of a metrology system 10 in accordance with the principles of the present invention is shown. The metrology system 10 includes a plurality of photo-emitting heads 12, a plurality of photo-detecting targets 14, a master signal generator 16, and a signal processor 18. The photo-detecting targets 14 are each positioned at first locations, typically located on the various objects (not illustrated) to be assembled, within a volume defining an assembly area. The photo-emissive heads 12, which are each positioned at second locations within the volume, are each configured generate a pair of rotating radiation fan-beams 20A and 20B. The master signal generator 16 and/or signal processor 18 are provided in or near the assembly area, typically out of the way of the heads 12 and targets 14.

In various embodiments, the master signal generator 16 and the signal processor 18 communicate with the heads 12 and the targets 14 using Radio Frequency (RF) signals. In various embodiments, the master signal generator 16 and the signal processor 18 can be implemented separately, as illustrated in the figure, or they can be integrated together, for example, using a computer that performs both the master signal generation and signal processing functions. In yet other embodiments, the photo-emitting heads 12 can be in communication with the master signal generator 16 and/or signal processor 18 through either wired electrical connections or over fiber optic cables. In this latter embodiment, the heads 12 and the master signal generator 16 and/or signal processor 18 communicate with one another either entirely over the wired and/or optical connections are both using RF and the wired and/or optical connections.

Figure 2A:
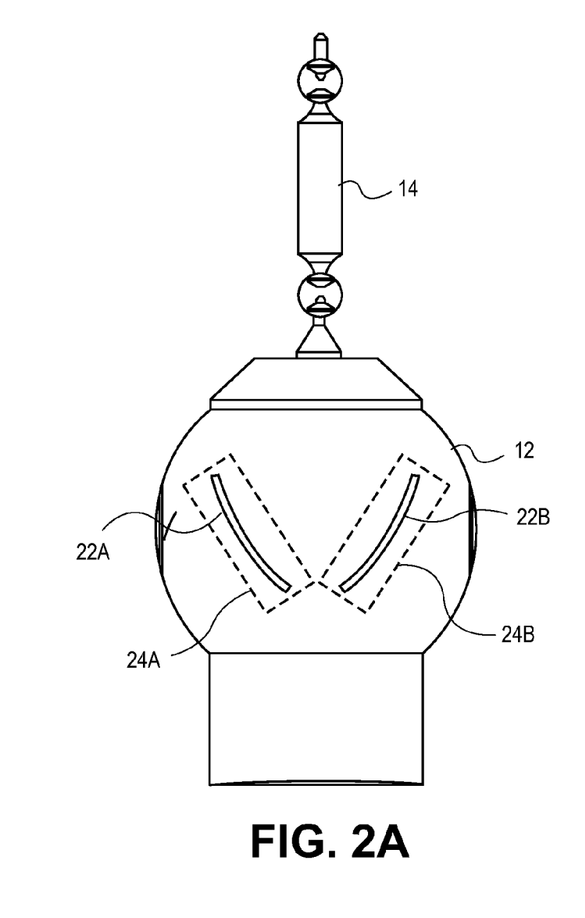
FIG. 2A illustrates a non-exclusive embodiment of a rotating photo-emitting head used in the metrology system of the present invention.

Referring to FIG. 2A, a non-exclusive embodiment of one of the photo-emitting heads 12 is shown. The head 12 is spherical or cylindrical in shape and includes two slit-shaped fields of view 22A and 22B arranged at opposing degrees with respect to one another in a V-shaped pattern. Photo-emitters 24A and 24B, such as LEDs or lasers, are provided behind the slit pair 22A and 22B and internal to the head 12. With this arrangement, the two fan-beams 20A and 20B are generated when radiation from the photo-emitters 24A and 24B pass through the slit-shaped fields of view 22A and 22B respectively. In one non-exclusive embodiment, the two slit 22A and 22B are arranged at +/−45 degrees with respect to one another. As a result, the fan-beams 20A and 20B form a "V" shaped radiation pattern with a first fan-beam 20A having a +45 degree inclination and the second fan-beam 20B having a −45 degree inclination. In alternative embodiments, the degree at which the slit-shaped fields of view 22A and 22B may be arranged with respect to one another may vary. For example, the slit-shaped fields of view 22A and 22B, and the resulting fan-beams 20A and 20B, may range anywhere from +/−10 to +/−60 degrees. In various other embodiments, the entire head 12 or just the portion of the head 12 that generates the fan beams 20A and 20B may rotate.

Figure 2B:
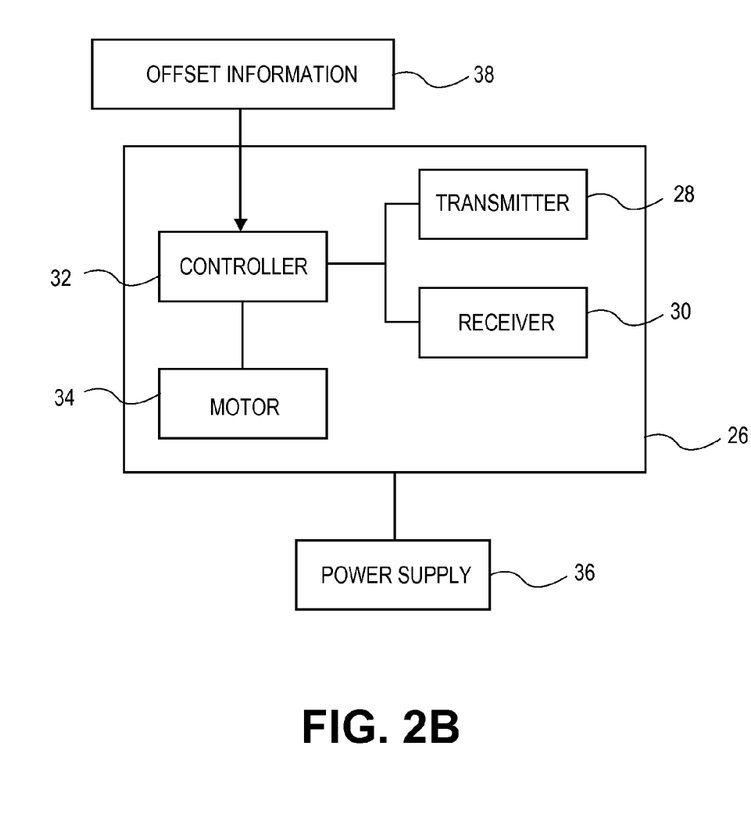
FIG. 2B is a block diagram of a non-exclusive embodiment of the electronics contained in the rotating photo-emitting head used in the metrology system of the present invention.

Referring to FIG. 2B, a block diagram of a non-exclusive embodiment of the electronics 26 contained in each of the heads 12 is illustrated. The electronics 26 includes a transmitter 28, a receiver 30, a controller 32, motor 34, and power supply 36. The transmitter 28 and receiver 30 are configured to transmit and receive RF signals to and from the signal processor 18. Alternatively, the transmitter 28 and receiver 30 can be combined into a transceiver as is well known in the art. The controller 32 directs the transmitter 28 to transmit a unique identifier code, which uniquely identifies each head 12, in the system 10. The master signal generator 16 optionally generates control signals to independently turn the heads 12 on or off, or direct each head 12 to rotate at a specific rate for example. The controller 32 can be any type electronic control element, such as a micro-controller or micro-processor. The motor 34 may be any type of motor such as an electric motor. The power supply 36 may be a DC power supply, an AC power supply, battery, or a rechargeable battery.

During operation, the controller 32 of each head 12 optionally receives rotation rate instructions from the master signal generator 16. In a non-exclusive embodiment, the information may define a constant reference rotational rate of forty revolutions per second for example. In addition, each controller 32 receives offset information that instructs each head 12 to rotate at a different rate with respect to one another.

Figure 3A:
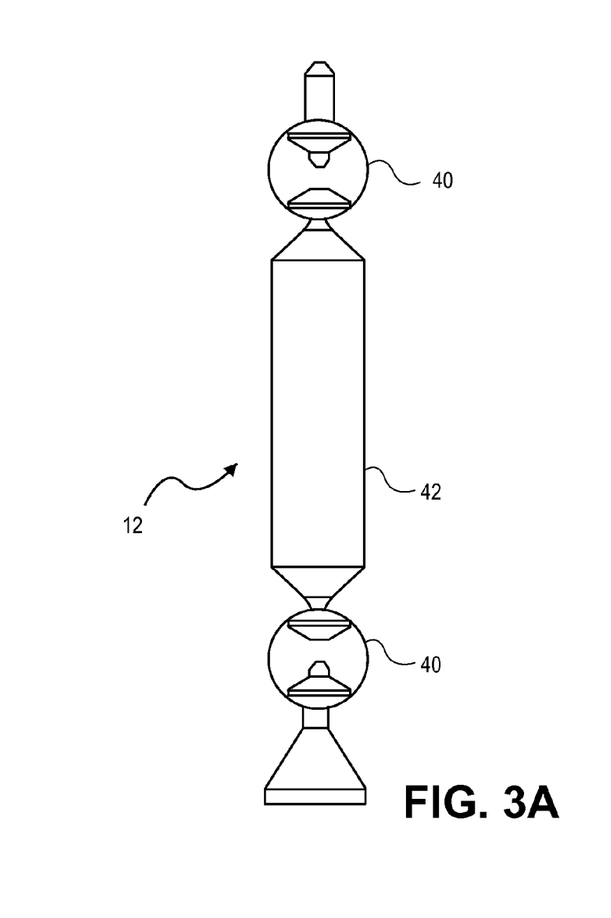
FIGS. 3A and 3B illustrate a non-exclusive embodiment of a photo-detecting target that may optionally be used in the metrology system of the present invention.
Figure 3B:
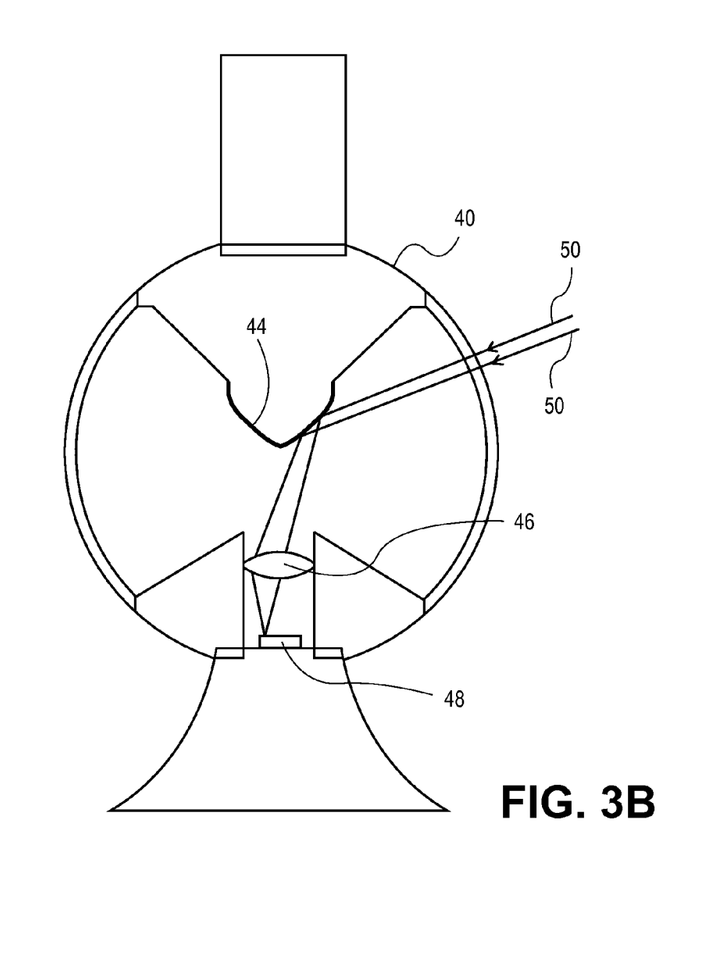

Referring to FIG. 3A, a non-exclusive embodiment of a photo-detecting target 14 is shown. Each target 14 includes a pair of transparent spheres 40 laterally spaced apart from one another by an elongated structure 42. As best illustrated in FIG. 3B, each sphere 40 includes a reflective surface 44, a lens 46, and a photo-detector 48, such as a silicon detector, Charge Coupled Device (CCD) or CMOS detector array. With this arrangement, radiation from the fan-beams 20A and 20B, as represented by the arrows 50, enter the sphere 40, reflect off the reflective surface 44 and onto the photo-detector 48 through the lens 46.

Each of the photo-detecting targets 14 of FIGS. 3A and 3B has the two photo-detectors 48 spaced apart from one another at a common, known, lateral distance. Since the distance and configuration of the two photo-detectors 48 is known, the distance and the orientation of the target 14 can be determined more accurately. In any case, it is important that the orientation of the targets 14 be determined so as to determine the precise location of the object to be assembled that is being measured.

Figure 4A:
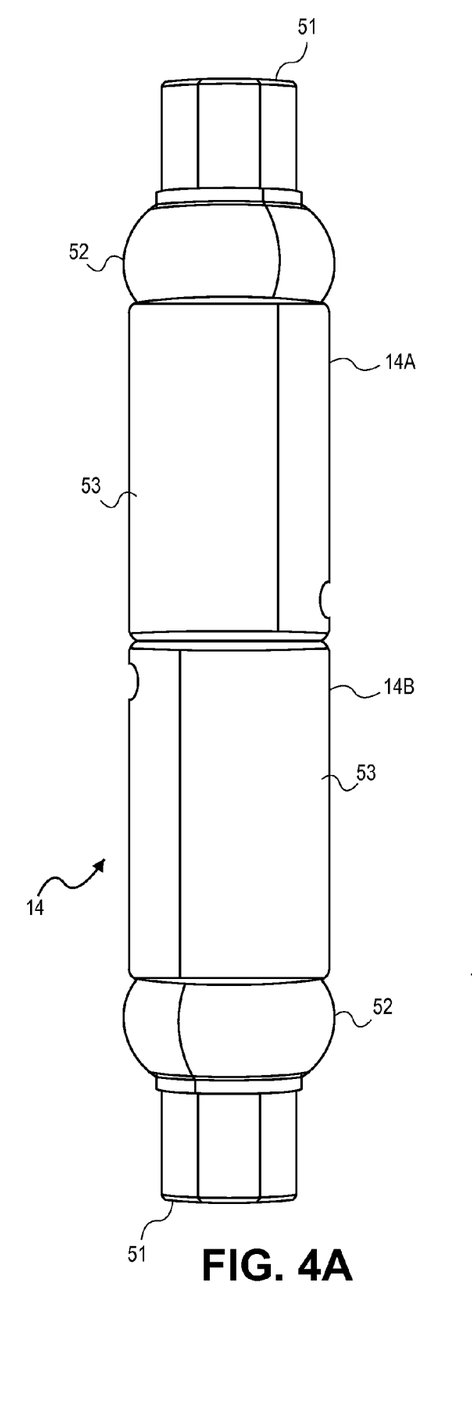
FIGS. 4A and 4B illustrate another non-exclusive embodiment of a photo-detecting target that may optionally be used in the metrology system of the present invention.
Figure 4B:
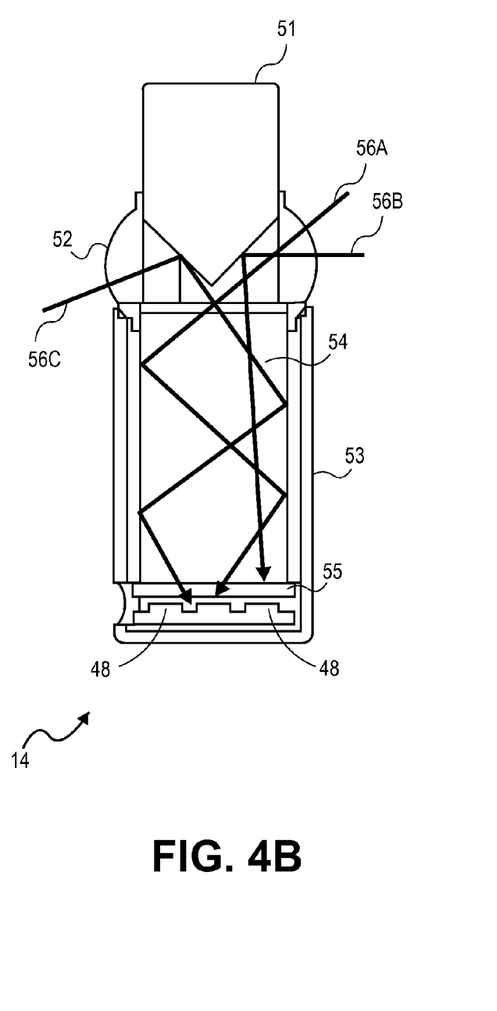

Referring to FIGS. 4A and 4B, another non-exclusive embodiment of a photo-detecting target 14 is shown. The target 14 actually includes two targets 14A and 14B positioned opposing one another in a vertical alignment. As best illustrated in FIG. 4B, each target 14 includes a cone mirror 51, a transparent surface 52 such as wide angle 360 degree optical lens, a housing 53 including an integrating light rod 54, a diffusing narrow band or notch optical filter 55, and one or more photo-detectors 48. With this arrangement, the integrating light rod 54 is provided between the cone mirror 51 and lens 52 optics and the photo-detectors 48. During operation, light rays from the fan-beams 20A and 20B, as represented by arrows 56A, 56B and 56C, enter 360 degrees around the target 14 through the optical lens 52, reflect off the cone mirror 51, through the integrating light rod 54, and onto the one or more photo-detectors 48 through the notch filter 55. By positioning the two targets 14A and 14B opposing one another, the optical lenses 52 are laterally spaced apart from one another so that the orientation of the target 14 can be determined and be used to determine the precise location of the object to be assembled.

The arrangement of FIGS. 4A and 4B provides a number of advantages. For example, is the off axis placement of the photodiodes and sensitive circuitry. Having these active components inside of an electromagnetic shielded housing minimizes the electromagnetic interference (noise) from large machinery, robot motors, etc. from getting into the signal. Prior designs have the photodiodes, harnesses and sensitive circuits directly exposed to the environment. This concept separates the sensitive components away from the noise inside a shielded EMC enclosure leaving only the passive optics in the direct line of sight with the environment.

Figure 5:
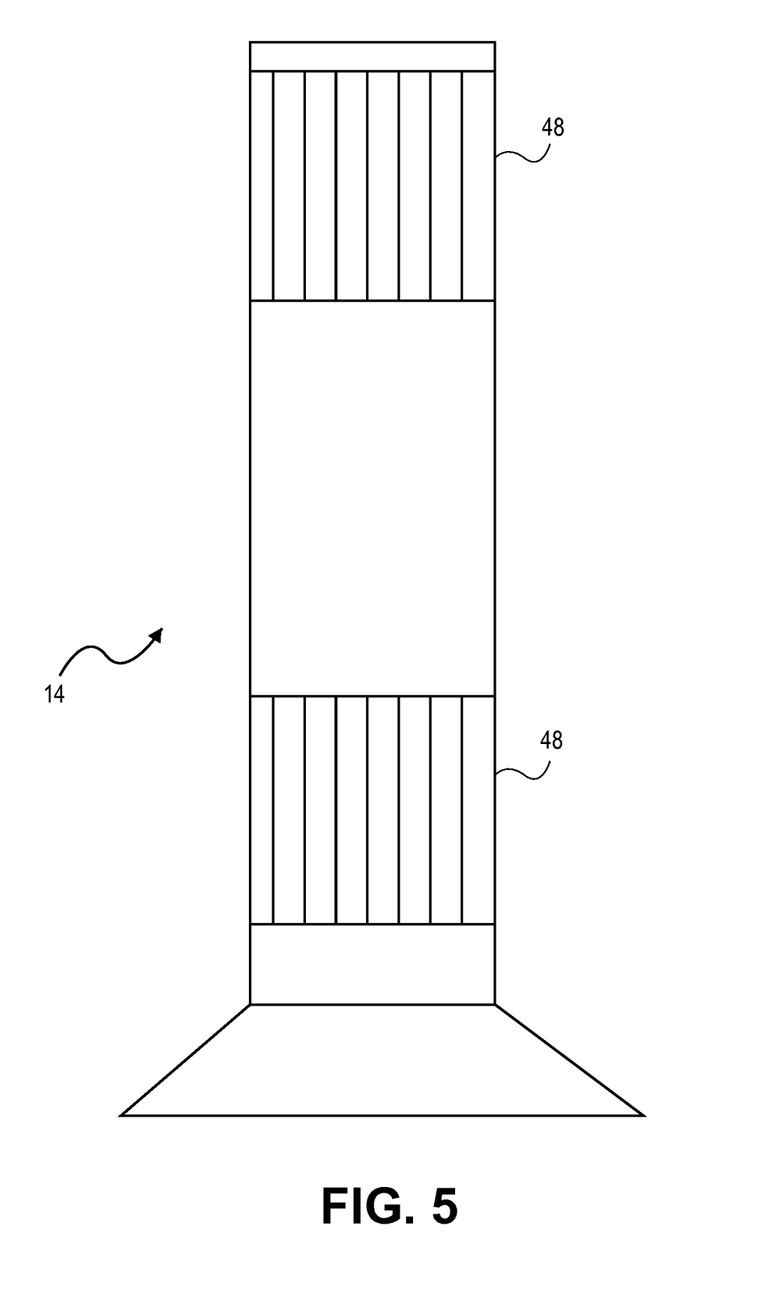
FIG. 5 illustrates another non-exclusive embodiment of a photo-detecting target that may optionally be used in the metrology system of the present invention.

Referring to FIG. 5, another non-exclusive embodiment of a photo-detecting target 14 is shown. With this embodiment, the target 14 includes two photo-detecting arrays 48 spaced apart at a known lateral distance. Since the distance and configuration of the two photo-detector arrays 48 is known, the distance and the orientation of the target 14 can be determined more accurately. In any case, it is important that the orientation of the targets 14 be determined so as to determine the precise location of the object to be assembled that is being measured.

Figure 6:
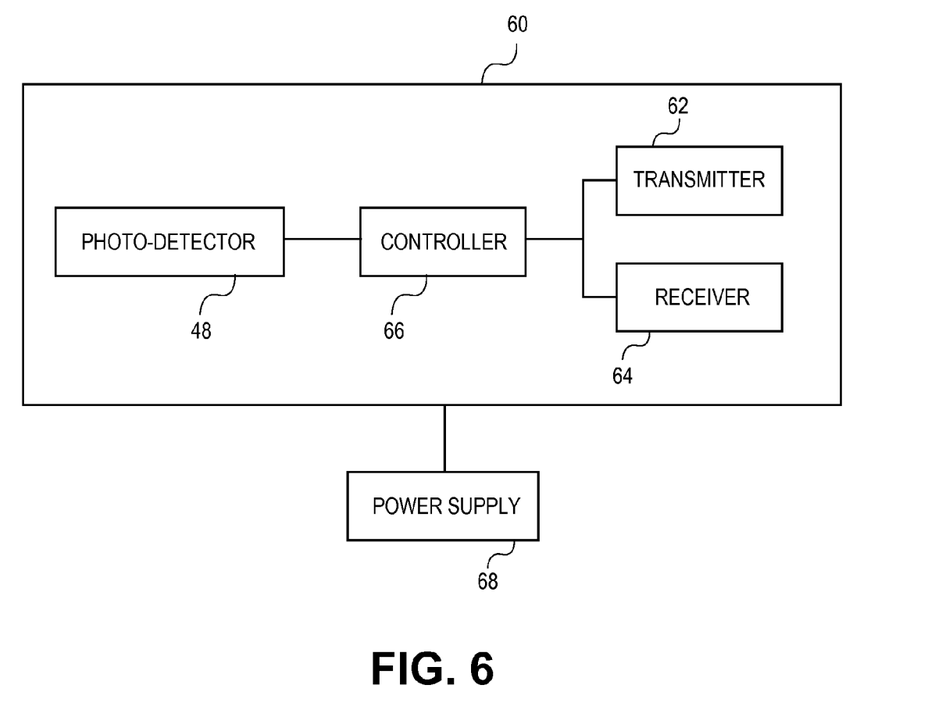
FIG. 6 is a non-exclusive block diagram of the electronics contained in the photo-detecting targets used in the metrology system of the present invention.

FIG. 6 is a block diagram of a non-exclusive embodiment of the electronics 60 contained in the various embodiments of the photo-detecting targets 14. The electronics 60 includes a transmitter 62, a receiver 64, a controller 66, the photo-detector(s) 48, and a power supply 68. The transmitter 62 and receiver 64 are configured to communicate with the master signal generator 16 and signal processor 18 using a wireless network using RF signals. Alternatively, the transmitter 62 and receiver 64 can be combined into a transceiver as is well known in the art. The transmitter 62, under the control of the controller 66, is configured to transmit signals generated by the photo-detector(s) 48 to the signal processor 18. In addition, a unique identifier code, which uniquely identifies each target 14 in the system 10, may also be transmitted. The unique code allows the signal processor 18 to know which target 14 it is communicating with. The controller 66 can be any type electronic control element, such as a micro-controller or micro-processor. The power supply 68 may be a DC power supply, an AC power supply, battery, a rechargeable battery.

Prior to operation, it is necessary to determine the location of each of the photo-emitting heads 12 within the volume defining the assembly area. In accordance with various embodiments, this can be accomplished in a number of different ways. In one embodiment, each of the heads 12 is placed at a known location. Alternatively, a target 14 may be placed at each of the heads 12. The heads 12 are then placed at different locations within the volume defining the assembly area. Thereafter, a calibration sequence is performed to determine the X, Y, Z position of each of the heads 12 with in the volume defining the assembly area. This calibration sequence involves rotating the heads 12 so that each head generates a fan-beam pair 20A and 20B. At the same time, all of the photo-detecting targets 14, except those placed at each of the heads 12, are turned off. As described in more detail below, the signal processor 18 then determines the position of each of the heads 12 based on signals derived from the radiation received from the activated photo-detecting targets 14 on top of the heads 12. Once the calibration process is complete and the position of the heads 12 is known, the system 10 may be used for the assembly of components.

Referring again to FIG. 2A, a non-exclusive embodiment is shown with a target 14 placed on top of a head 12. This is just one of many possible ways a target can be placed at a head 12 for calibration purposes.

Figure 7:
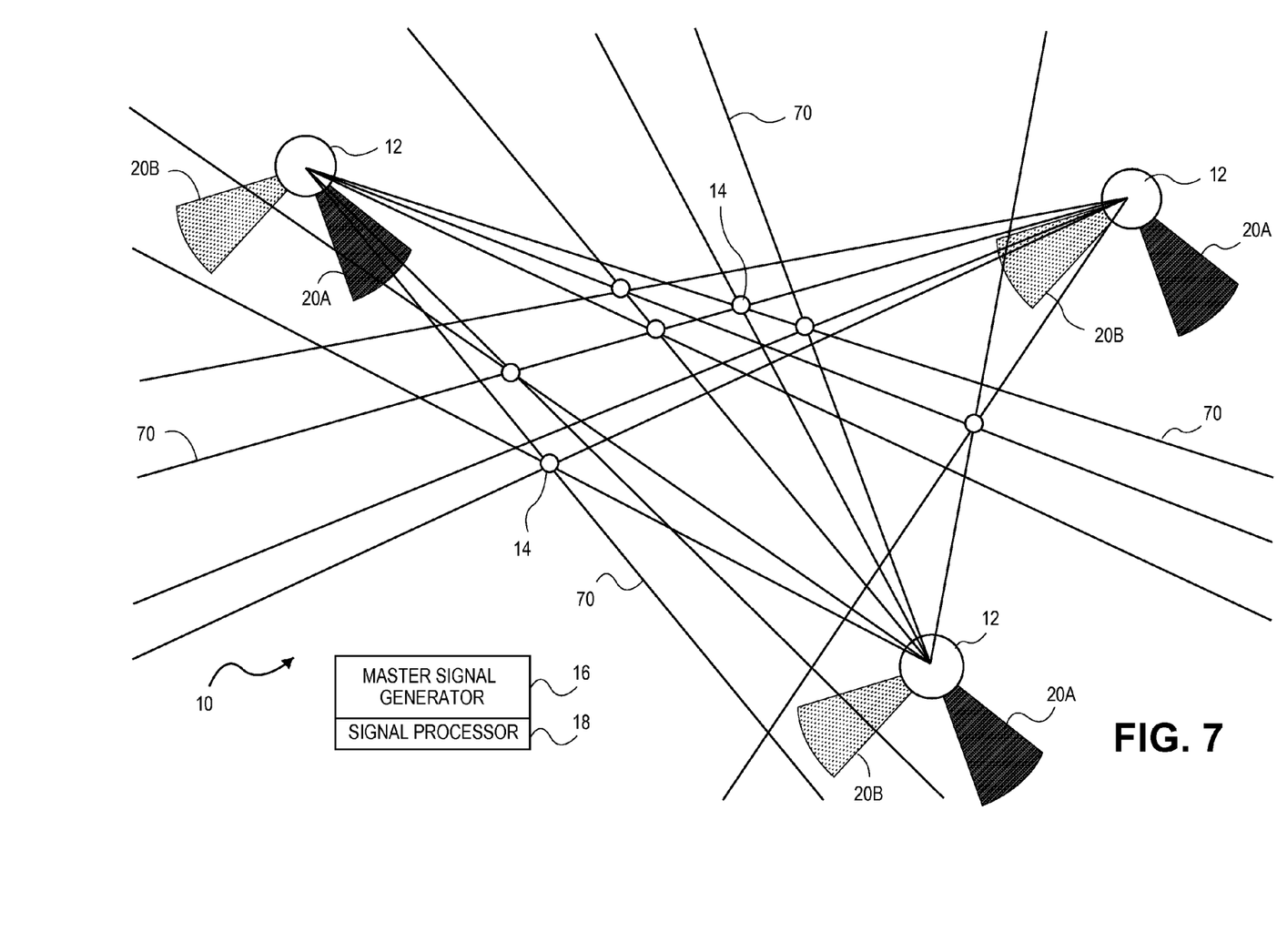
FIG. 7 illustrates the metrology system of the present invention during operation.

Referring to FIG. 7, the metrology system 10 during operation is illustrated. In this example, each of the photo-detecting targets 14 are turned on and have been placed on the components to be assembled (not illustrated), while the position of each of the photo-emitting heads 12 is known using either of the calibration methods described above.

The master signal generator 18 broadcast RF signals to the heads 12 and targets 14 that: (i) optionally define a fixed rotational rate for the fan beams 20A and 20B, (ii) optionally define the rotational offset for each fan beam pair 20A and 20B so that they each rotate at a different rate relative to the fixed rotational rate; (iii) defines a RF reference signal that enables each of the photo-emitting heads 12 to determine the azimuth position of its corresponding fan beam pair 20A and 20B relative to a "zero" degree timing reference position. For example, if the fan beams 20A and 20B of a given head 12 are rotating at 41.7 revolutions per second, each rotation takes 24 milliseconds. This means if the RF reference signal is received 3 milliseconds after the fan beams 20A and 20B have crossed the zero degree timing reference position, then the azimuth is 45 degrees; and (iv) synchronizes the system master clocks to the internal clocks of the targets 14.

In various embodiments, the RF signal is a periodic change in a frequency transmission at a fixed interval in either the amplitude or frequency domain. The fixed interval can range anywhere from relatively short (i.e., one or more nanoseconds) to relatively long (one or more seconds).

In further embodiments, the RF signals may be shared with other transmissions on the same frequency. For example, the controller 32 of the heads 12 and/or the controller 66 of the targets 14 should preferably be configured to separate the RF signals from other communication signals from the master signal generator 16 and/or signal processor 18. For instance, the master signal generator 16 and/or signal processor 18 may broadcast a warning signal or command after which time the heads 12 and/or targets 14 would remain quiet and wait for the next RF signal, which would be recognized as the RF signal for defining (i), (ii) (iii) and/or (iv) as described in the previous paragraph. Each head 12 and target 14 would then synchronize its internal clock based on the RF signal. Alternatively, each head 12 and/or target 14 would broadcast to the master signal generator 16 and/or signal processor 18 the exact time that it received the RF signal.

As the fan beam pair 20A and 20B of each head 12 rotates, the azimuth 360 degrees around each head 12 is scanned respectively. With each revolution, the corresponding fan-beam pair 20A and 20B sweeps across the two photo-detectors 48 of each target 14. In response, the photo-detector 48 of each target 14 generates a pulsed pair of signals for each revolution of the fan beam pair 20A and 20B per head 12. As the objects to be assembled are moved, the transmitters 62 of each target 14 continually transmit the pulsed pair signals to the signal processor 18 as the fan beam pairs 20A and 20B rotate within the volume.

In response, signal processor 18 determines for each pulse pair:

(i) the corresponding 12 head. Since each head 12 rotates at a different rate, the time for each fan-beam pair 20A and 20B to make a full rotation is different. For example, the time rotational time of a fan-beam pair 20A and 20B rotating at 39 revolutions per second will be different than the rotational time of another fan-beam pair 20A and 20B rotating at 41 revolutions per second. Based on this timing information, the corresponding head 12 responsible for generating each pulsed pair of signals is determined;

(ii) the azimuth of the target 14 relative each head 12. As noted above, each head 12 determines its azimuth angle at the moment of the RF reference signal. The azimuth of each target 14 relative to the corresponding head 12 is then determined by (a) the elapsed time between the RF reference signal and the pulse pair of signals derived from the fan beams 20A and 20B of the corresponding head and (b) the azimuth angle of the corresponding head at the time of the RF reference signal.

(iii) the elevation of the target 14 relative to the corresponding head 12 based on the timing between the first pulse and the second pulse of the pulsed pair of signals.

The signal processor 18 then generates a vector 70 for each pulsed pair of signals. Each vector 70 originates at the corresponding head 12 and is defined by the determined azimuth and elevation. Based on the algorithms described above, the signal processor 18 determines the instantaneous X, Y and Z position for each of the targets 14, as illustrated in FIG. 6. As the objects to be assembled are moved, the instantaneous X, Y and Z position information of the targets 14 is updated by the processor 18 on the fly. As a result, the objects can be assembled with a high degree of accuracy and precision.

As noted above, if the location of the heads 12 is not previously known, a calibration process is first needed before the metrology system 10 may be used for assembly. During the calibration process of a non-exclusive embodiment, the signal processor 18 turns off all the targets 14, except those positioned at the heads 12. The above-described process is then performed using the same algorithms. The intersecting vectors 70 define the location of the active targets 14, and hence the heads 12. Once the location of the heads 12 is known, the system 10 may be used for assembly as described above.

Figure 8:
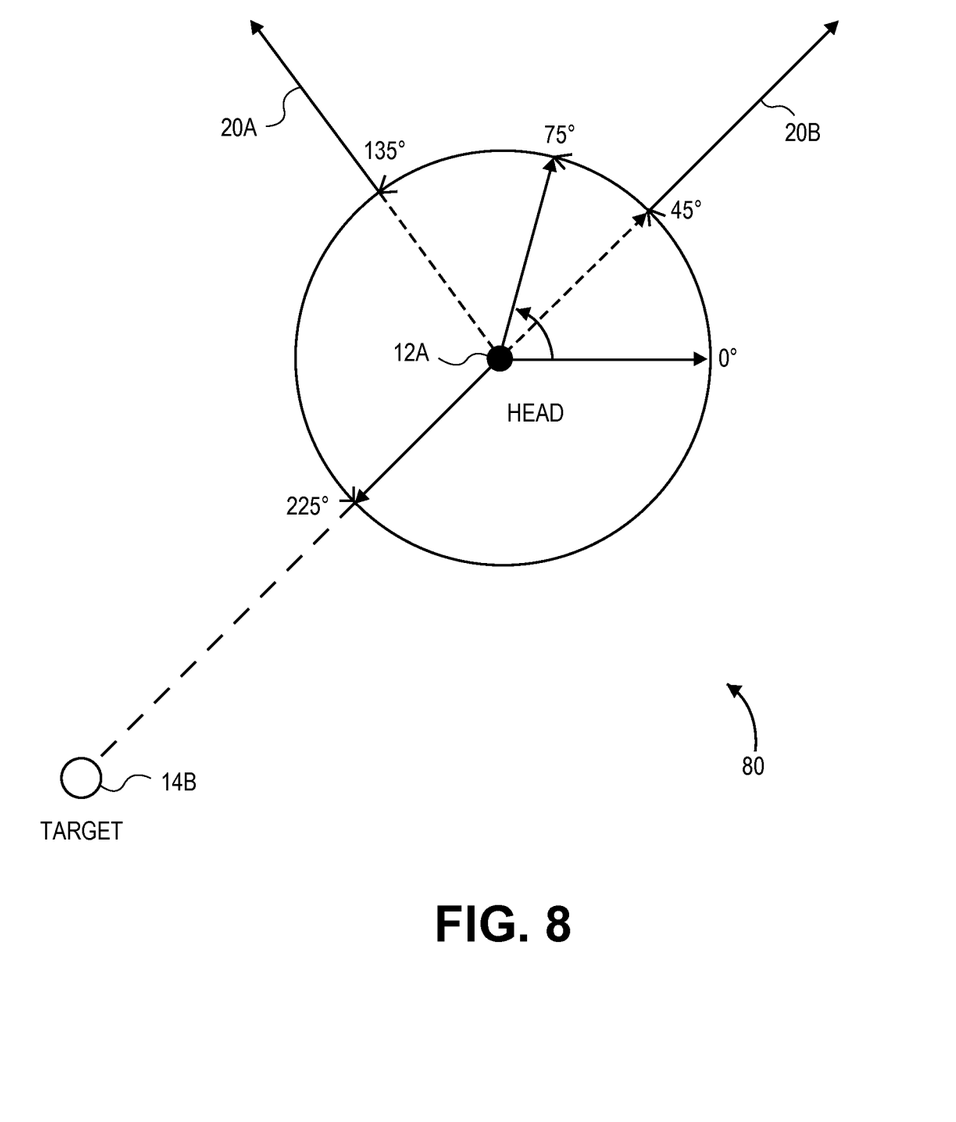
FIG. 8 is a diagram illustrating the operation of the metrology system of the present invention during assembly operation.

Referring to FIG. 8, a diagram 80 illustrating operation of the metrology system 10 is shown. The diagram shows a selected head 12A with fan beams 20A and 20B rotating counter-clockwise 45° apart. In this example, the fan beam pair 20A and 20B are rotating at a rate of 15° per 0.001 seconds (15°/msec), which is the equivalent of 41.7 revolutions per second or 24 msec per revolution. With each rotation of the fan beam pair 20A and 20B, the head 12A resets its internal clock each time the leading fan beam 20A crosses the 0° reference position, which may be implemented using for example a sensor. Further in this example, the head 12A detects the RF reference signal at a rotational position of 75° relative to the 0° reference position. As a result, the fan beam 20A is at 135° and the fan beam 20B is at 45° relative to the 0° reference position at the time of the RF reference signal.

The head 12A resets its internal clock $t_{HA}$ to zero ($t_{HA}=0.0$) each time the leading fan beam 20A crosses the 0° reference position. In this example when the RF reference signal is detected at 75°, the elapsed time between the 0° reference position and the RF reference signal detected at 75° is therefore 5 msec ($t_{HA}=5$ msec), which is transmitted to the signal processor 18. The above process is continuously repeated by head 12A with each rotation of the fan beams 20A and 20B and occurrence of the RF reference signal.

In response to the RF reference signal, the target 14B also calibrates or resets its internal clock ($t_{TB}=0.0$). As the fan beams 20A and 20B sweep past the photo-detector 48 of the target 14B, a first pulse is generated at 7.0 msec ($t_{TB1}=7.0$ msec) and the second pulse is generated at 13.0 msec ($t_{TB2}=13.0$). The timing of both pulses is transmitted by the target 14B to the signal processor 18. The above process is continually repeated with each rotation of the fan beams 20A and 20B and occurrence of the RF reference signal.

The master signal generator 16 continually broadcasts the RF reference signal at a fixed time interval. With each broadcast, the internal clock of the signal processor 18 is reset to zero (t=0) plus optionally a constant to compensate for the speed of light and the flight of the RF signals, as described in more detail below. In addition, the signal processor receives the timing signals ($t_{HA}$) from the head 12A and the ($t_{TB1}$) and ($t_{TB2}$) timing signals from the target 14B. Since the head 12A in question is the only head 12 that rotates at (15°/msec), all the timing information from the other heads 12 and targets 14 (i.e., all data that does not repeat at 24 msec intervals) can be ignored. The signal processor 18 then calculates the azimuth angle of the head 12A for target 14B using the equation:

$$[t_{ha}+((t_{TB1}+t_{TB2})/2)]\times15°=[5+((7+13)/2)]\times15°=225°$$

The above-example continually is repeated for each of the heads 12 and targets 14 in the system 10 per each occurrence of the RF reference signal. Since each head 12 rotates at a different rate, any data that does not repeat at the same interval is ignored for the calculation of the equation recited above for a given head 12 and target 14 combination. In this manner, the azimuth angle of every head 12 for each target 14 is continually determined.

In an alternative embodiment, the signal processor 18 may be configured to compensate for the speed of light in performing the azimuth and elevation calculations. After the approximate location of the heads 12 is known, the signal processor 18 can be configured to compensate for the relative distances between the heads 12 and the targets 14. For example, one target 14 may be 5 meters from a given head 14, while another target may be 25 meters away from the same head 12. As a result, the latter target 14 may see the fan beams 20A and 20B from the head 12 slightly after the former target 14. In situations where very high precision and accuracy is needed or desired, the signal processor 18 may be programmed to compensate for the time it requires for the light signals to transmit between the relative distances between the heads 12 and the targets 14. Since the speed of light is approximately $3\times10^8$ meters per second, light travels 0.3 meters in one nanosecond. A head 12 or target 14 that is located 30 meters away from the master signal generator 16 and/or signal processor 18 will have a timing error of 100 milliseconds. For the system described above, the potential distance cause by a 100 millisecond error of a target 14 located 30 meters from a head 12 is 19 micro meters.

In yet another alternative embodiment, the signal processor 18 may be configured to compensate for the time of flight of the RF signals in performing the azimuth and elevation calculations. This compensation is performed by placing the master signal generator 16 and/or signal processor 18 at a known location relative to the heads 12 and the targets 14 and using an algorithm to compensate for the time of flight.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. A system, comprising:
    at least one photo-detecting target configured to be positioned at a first location within a predetermined volume;
    a plurality of photo-emitting heads configured to each be positioned at second locations within the predetermined volume, each of the photo-emitting heads configured to generate a rotating fan beam pair;
    a master signal generator that generates a reference RF signal that is broadcast to the at least one photo-detecting target; and
    a signal processor configured to determine the position of the at least one photo-detecting target within the volume from signals generated by the at least one photo-detecting target in response to the plurality of rotating fan beam pairs.

2. The system of claim 1, wherein the signal processor determines a reference azimuth angle of a selected photo-emitting head among the plurality of photo-emitting heads.

3. The system of claim 2, wherein the signal processor determines the reference azimuth angle of the selected photo-emitting head from information generated by the selected photo-emitting head and transmitted to the signal processor.

4. The system of claim 3, wherein the transmitted information includes timing information related to the rotating fan beam pair generated by the selected photo-emitting head relative to the reference RF signal.

5. The system of claim 3, wherein the transmitted information includes timing information related to the rotating fan beam pair generated by the selected photo-emitting head relative to a zero reference position.

6. The system of claim 2, wherein the signal processor determines the azimuth of the at least one target relative to the selected photo-emitting head by determining (a) the elapsed time between the RF reference signal and a pulse pair of signals generated by the at least one target derived from the fan beam pair of the selected photo-emitting head and (b) the reference azimuth angle of the selected head as determined in claim 2.

7. The system of claim 2, wherein the at least one target is configured to use the reference RF signal to calibrate an internal clock that is used to time the detection of the fan beam pair of the selected photo-emitting head.

8. The system of claim 2, wherein the at least one target is configured to report to the signal processor timing information related to a first fan beam and a second fan beam of the rotating fan beam pair generated by the selected photo emitting head.

9. The system of claim 2, wherein the at least one target is configured to report to the signal processor the elapsed time between the RF reference signal and detection of a first fan beam and a second fan beam of the rotating fan beam pair generated by the selected photo emitting head.

10. The system of claim 1, wherein the signal processor is further configured to determine (i) a reference azimuth angle for each of the plurality of photo-emitting heads and (ii) an azimuth for a plurality of photo-detecting targets, each positioned at different first locations within the volume, relative to each of the plurality of photo-emitting heads.

11. The system of claim 1, wherein the RF reference signal comprises a predetermined change in a radio frequency transmission.

12. The system of claim 11, wherein the change in the radio frequency transmission occurs at a fixed interval.

13. The system of claim 12, wherein the fixed interval ranges from one nanosecond to a plurality of seconds.

14. The system of claim 1, further comprising a plurality of the photo-detecting targets arranged at different first locations within the volume, the photo-detecting targets each generating a plurality of pulse pair of signals, each of the plurality of pulsed pair signals generated per revolution of the rotating fan beam pairs of the plurality of photo-emitting heads respectively.

15. The system of claim 14, wherein the fan beam pairs generated by the plurality of rotating photo-emitting heads each rotate at a different rate.

16. The system of claim 15, wherein the signal processor is further configured to identify which of the plurality of photo-emitting heads resulted in each of the plurality of pulsed pair signals based on the different rotational rates of each of the fan beam pairs respectively.

17. The system of claim 14, wherein the signal processor is further configured to determine the azimuth of each of the plurality of photo-detecting targets relative to each of the plurality of photo-emitting heads respectfully.

18. The system of claim 14, wherein the signal processor is further configured to ascertain the elevation of each of the plurality of photo-detecting targets from the time difference between a first pulse and a second pulse of each of the plurality of pulsed pair of signals respectively.

19. The system of claim 14, wherein the signal processor is further configured to generate a plurality of vectors corresponding to each of the plurality of pulsed pair signals, each of the plurality of vectors originating at a corresponding one of the plurality of photo-emitting heads and defining an elevation and azimuth.

20. The system of claim 19, wherein the processor is further configured to:
    ascertain intersecting vectors among the plurality of vectors; and
    ascertain an X, Y and Z position within the volume for each of the plurality of targets from the intersecting vectors.

21. The system of claim 1, wherein each of the rotating fan-beam pairs defines an elevation range from +/−10 degrees to +/−60 degrees.

22. The system of claim 1, wherein each of the rotating fan-beam pairs forms a "V" shaped radiation pattern with a first fan-beam having a first inclination and a second fan beam having a second inclination, wherein the first and the second inclinations are relative to the axis of rotation and are in the opposite direction from one another.

23. The system of claim 1, wherein the at least one photo-detecting target includes a first photo-detector and a second photo-detector, wherein the first photo-detector is laterally spaced from the second photo-detector.

24. The system of claim 23, wherein the signal processor is further configured to ascertain an orientation of the at least one photo-detecting target from the position of the first photo-detector relative to the second photo-detector.

25. The system of claim 23, further comprising:
a transparent surface;
a cone mirror;
an integrating light rod; and
an optical filter,
the cone mirror, integrating light rod and the optical filter are provided between the transparent surface and the first photo-detector.

26. The system of claim 1, wherein the master signal generator is further configured to continually generate the reference RF signal at fixed time interval during assembly operation.

27. The system of claim 1, wherein the master signal generator is further configured to broadcast the reference RF signal to a plurality of photo-detecting targets.

28. The system of claim 1, wherein the master signal generator is further configured to broadcast the reference RF signal from the plurality of photo-emitting heads.

29. The system of claim 28, wherein the photo-detecting target is further configured to synchronize one or more internal clocks with the reference RF signal.

30. The system of claim 1, wherein the reference RF signal is used to determine the azimuth of the fan beam pair generated by the plurality of photo-emitting heads respectfully.

31. The system of claim 30, wherein the azimuth of the fan beam pair generated by the plurality of photo-emitting heads are each determined relative to zero degree timing reference position.

* * * * *